US009606228B1

(12) United States Patent
Wise (10) Patent No.: US 9,606,228 B1
(45) Date of Patent: Mar. 28, 2017

(54) HIGH-PRECISION DIGITAL TIME-OF-FLIGHT MEASUREMENT WITH COARSE DELAY ELEMENTS

(71) Applicant: Banner Engineering Corporation, Minneapolis, MN (US)

(72) Inventor: Ashley Karl Wise, Plymouth, MN (US)

(73) Assignee: BANNER ENGINEERING CORPORATION, Minneapolis, MN (US)

( * ) Notice: Subject to any disclaimer, the term of this patent is extended or adjusted under 35 U.S.C. 154(b) by 543 days.

(21) Appl. No.: 14/184,912

(22) Filed: Feb. 20, 2014

(51) Int. Cl.
*G01S 17/02* (2006.01)

(52) U.S. Cl.
CPC .................................... *G01S 17/02* (2013.01)

(58) Field of Classification Search
CPC ................................. G01T 1/202; H03M 1/50
See application file for complete search history.

(56) References Cited

U.S. PATENT DOCUMENTS

| | | |
|---|---|---|
| 5,075,878 A | 12/1991 | Ohtomo et al. |
| 5,353,228 A | 10/1994 | Geiss et al. |
| 5,745,442 A | 4/1998 | Herscher |
| 5,805,468 A | 9/1998 | Blöhbaum |
| 5,949,530 A | 9/1999 | Wetteborn |
| 5,953,109 A | 9/1999 | Lai et al. |
| 5,991,011 A | 11/1999 | Damm |
| 6,100,539 A | 8/2000 | Blümcke et al. |
| 6,115,112 A | 9/2000 | Hertzman et al. |
| 6,137,749 A | 10/2000 | Sumner |
| 6,310,682 B1 | 10/2001 | Gavish et al. |
| 6,429,941 B1 | 8/2002 | Kamon et al. |
| 6,452,666 B1 | 9/2002 | Barna et al. |
| 6,466,168 B1 | 10/2002 | McEwan |
| 6,483,121 B1 | 11/2002 | Ohishi et al. |
| 6,509,958 B2 | 1/2003 | Pierenkemper |
| 6,657,705 B2 | 12/2003 | Sano et al. |
| 6,710,324 B2 | 3/2004 | Hipp |
| 6,717,170 B2 | 4/2004 | Wörner |
| 6,754,613 B2 | 6/2004 | Tabatabaei et al. |
| 6,765,393 B2 | 7/2004 | Pierenkemper et al. |
| 6,801,305 B2 | 10/2004 | Stierle et al. |
| 6,864,966 B2 | 3/2005 | Giger |
| 6,950,177 B2 | 9/2005 | Lewis et al. |

(Continued)

FOREIGN PATENT DOCUMENTS

| | | |
|---|---|---|
| CN | 101034120 | 9/2007 |
| CN | 202182717 | 4/2012 |

(Continued)

*Primary Examiner* — Luke Ratcliffe
(74) *Attorney, Agent, or Firm* — Merchant & Gould P.C.

(57) ABSTRACT

A method of determining a timing of an occurrence of a signal includes: propagating the signal (such as an electrical signal) along a series of digital delay elements, or a delay line. Each delay element can have at least two states, each indicative of presence or absence of a signal. The distribution of states of at least a portion of the delay elements along the delay line are recorded multiple times during the time it takes a point (such as an edge) in the signal to propagate through the portion of the delay elements. The multiple recorded distributions are combined to determine the timing of occurrence of the signal to a greater resolution than the minimum system clock period and the minimum delay of each delay element.

22 Claims, 8 Drawing Sheets

(56) References Cited

U.S. PATENT DOCUMENTS

| | | |
|---|---|---|
| 7,006,203 B1 | 2/2006 | Book et al. |
| 7,012,248 B2 | 3/2006 | Paschalidis |
| 7,023,531 B2 | 4/2006 | Gogolla et al. |
| 7,075,626 B2 | 7/2006 | Schmidt et al. |
| 7,109,475 B1 | 9/2006 | Hardman et al. |
| 7,154,591 B2 | 12/2006 | Muenter et al. |
| 7,193,692 B2 | 3/2007 | Huang |
| 7,196,778 B2 | 3/2007 | Lin et al. |
| 7,205,924 B2 | 4/2007 | Vemulapalli et al. |
| 7,359,039 B2 | 4/2008 | Kloza |
| 7,423,937 B2 | 9/2008 | Bolli et al. |
| 7,427,940 B2 | 9/2008 | Staszewski et al. |
| 7,450,069 B2 | 11/2008 | Heidari-Bateni et al. |
| 7,463,983 B1 | 12/2008 | Patrick |
| 7,474,388 B2 | 1/2009 | Ohtomo et al. |
| 7,482,971 B2 | 1/2009 | Lyon |
| 7,499,150 B2 | 3/2009 | Lewis et al. |
| 7,501,973 B2 | 3/2009 | Choi et al. |
| 7,554,651 B2 | 6/2009 | Zhao |
| 7,557,906 B2 | 7/2009 | Mack |
| 7,564,284 B2 | 7/2009 | Henzler et al. |
| 7,570,182 B2 | 8/2009 | Sheba et al. |
| 7,623,221 B2 | 11/2009 | Thun et al. |
| 7,643,955 B2 | 1/2010 | Weilenmann |
| 7,667,633 B2 | 2/2010 | Choi et al. |
| 7,688,126 B2 | 3/2010 | Henzler et al. |
| 7,710,321 B2 | 5/2010 | Heidari-Bateni et al. |
| 7,714,990 B2 | 5/2010 | Gogolla et al. |
| 7,728,957 B2 | 6/2010 | Haase et al. |
| 7,773,203 B2 | 8/2010 | Tsai |
| 7,787,105 B2 | 8/2010 | Hipp |
| 7,791,377 B2 | 9/2010 | Kim et al. |
| 7,791,525 B2 | 9/2010 | Rivoir |
| 7,791,713 B2 | 9/2010 | Hipp |
| 7,800,737 B2 | 9/2010 | Luo et al. |
| 7,800,739 B2 | 9/2010 | Rohner et al. |
| 7,808,418 B2 | 10/2010 | Sun et al. |
| 7,852,464 B2 | 12/2010 | Kuijk et al. |
| 7,859,651 B2 | 12/2010 | Günther et al. |
| 7,864,303 B1 | 1/2011 | Benz et al. |
| 7,884,751 B2 | 2/2011 | Shimizu et al. |
| 7,888,973 B1 | 2/2011 | Rezzi et al. |
| 7,911,589 B2 | 3/2011 | Siercks |
| 7,920,248 B2 | 4/2011 | Satzky et al. |
| 7,928,888 B1 | 4/2011 | Chiu et al. |
| 7,940,378 B2 | 5/2011 | Gogolla et al. |
| 7,969,559 B2 | 6/2011 | Luo et al. |
| 7,977,980 B2 | 7/2011 | Deppe et al. |
| 7,978,111 B2 | 7/2011 | Sun et al. |
| 7,979,228 B2 | 7/2011 | Zurbuchen et al. |
| 7,986,270 B2 | 7/2011 | Heidari-Bateni et al. |
| 8,004,432 B2 | 8/2011 | Kawato |
| 8,018,580 B2 | 9/2011 | Luo et al. |
| 8,023,363 B2 | 9/2011 | Huang et al. |
| 8,064,561 B2 | 11/2011 | Henzler |
| 8,093,553 B2 | 1/2012 | Green |
| 8,138,843 B2 | 3/2012 | Straayer et al. |
| 8,164,493 B2 | 4/2012 | Hsieh |
| 8,219,346 B2 | 7/2012 | Zurbuchen et al. |
| 8,222,607 B2 | 7/2012 | Mann |
| 8,228,219 B2 | 7/2012 | Henzler et al. |
| 8,228,763 B2 | 7/2012 | Henzler |
| 8,279,415 B2 | 10/2012 | Welland et al. |
| 8,279,416 B2 | 10/2012 | Reiner et al. |
| 8,279,421 B2 | 10/2012 | Forrer et al. |
| 8,300,215 B2 | 10/2012 | Satzky et al. |
| 8,310,655 B2 | 11/2012 | Mimeault |
| 2005/0285058 A1 | 12/2005 | Beller |
| 2006/0001859 A1 | 1/2006 | Lohmann et al. |
| 2006/0109450 A1 | 5/2006 | Liu |
| 2006/0132754 A1 | 6/2006 | Gogolla et al. |
| 2006/0227315 A1 | 10/2006 | Beller |
| 2007/0272882 A1 | 11/2007 | Ishihara et al. |
| 2008/0007711 A1 | 1/2008 | Liu |
| 2009/0153377 A1 | 6/2009 | Chang |
| 2009/0262330 A1* | 10/2009 | Siercks .............. G01S 17/10 356/5.01 |
| 2010/0128246 A1 | 5/2010 | Heizmann et al. |
| 2010/0128247 A1 | 5/2010 | Heizmann et al. |
| 2010/0128248 A1 | 5/2010 | Heizmann et al. |
| 2010/0157282 A1 | 6/2010 | Arai et al. |
| 2010/0182588 A1 | 7/2010 | Reime |
| 2010/0260242 A1 | 10/2010 | Abe et al. |
| 2010/0283990 A1 | 11/2010 | Yang et al. |
| 2011/0051119 A1 | 3/2011 | Min et al. |
| 2011/0098970 A1 | 4/2011 | Hug et al. |
| 2012/0104259 A1* | 5/2012 | Mann .............. G04F 10/005 250/361 R |

FOREIGN PATENT DOCUMENTS

| | | |
|---|---|---|
| DE | 42 17 423 A1 | 2/1994 |
| JP | 2000065929 A | 3/2003 |
| WO | WO 91/13319 A1 | 9/1991 |
| WO | WO 96/22509 A1 | 7/1996 |
| WO | WO 96/39612 A1 | 12/1996 |
| WO | WO 99/31516 A1 | 6/1999 |
| WO | WO 2007/146587 A2 | 2/2007 |
| WO | WO 2012/137109 A2 | 10/2012 |

* cited by examiner

HIGH-PRECISION DIGITAL TIME-OF-FLIGHT MEASUREMENT WITH COARSE DELAY ELEMENTS

INTRODUCTION

This disclosure generally relates to determining the timing of occurrence of a signal, such as in determining the time-of-flight of a laser pulse from its emission to its subsequent detection, with or without intervening interaction with an object. More specifically, this disclosure relates to measuring the timing of the occurrence of a signal with high precision using a digital delay line with a coarser time resolution than the precision of the ultimate timing measurement.

Time-of-flight, or transit-time, measurements are widely used in many industries. They are used in electrical and optical fiber communication, range finding, industrial automation and safety, and area security. The precision required in position, or distance, determination in many applications dictates high-precision time measurement, which has often been realized by highly specialized devices, such as application-specific integrated circuits (ASICs). There is a need for devices and methods for more efficient or economical, high-precision time measurements.

SUMMARY

This disclosure relates to methods and devices determining the timing of occurrence of a signal, such as an electrical signal generated by an optical sensor when a laser pulse arrives at the sensor. In one aspect, a method of determining a timing of an occurrence of a signal includes: propagating the signal (such as an electrical signal) along a series of digital delay elements, or a delay line. The signal can be the ultimate signal whose timing is to be determined, or merely be corresponding to such an ultimate signal. For example, the time of detection of an optical signal may be desired, but the time of occurrence of the electrical signal generated by the detector upon the occurrence of the optical signal may be determined. Each delay element can have at least two states, the first state being indicative of presence of a signal, the second state being indicative of absence of a signal. The distribution of states of at least a portion of the delay elements along the delay line are recorded multiple times during the time it takes a point (such as an edge) in the signal to propagate through the portion of the delay elements. The multiple recorded distributions are combined to determine the timing of occurrence of the signal.

Furthermore, the process briefly described above can be repeated for signals that occur repetitively, such as those from an object reflecting a train of laser pulses. Each reflected pulse (or the corresponding electrical pulse) is processed as described above, and the resulting distributions from all reflected pulses are combined to determine the time of occurrence.

According to another aspect, a device for high-precision timing determination includes a digital delay line (such as a field programmable gate array (FPGA)) comprising a series of delay elements, the delay line being capable of receiving the a signal and propagating the signal serially through the delay elements, each delay element being switchable between at least a first state indicative of a signal present and a second state indicative of signal absent; a plurality of memory elements (such as register array), each corresponding to a respectively one of the delay element and adapted to record the state of the respective delay element; a controller adapted to trigger captures of the states of delay elements by the memory elements successively multiple times during a time period a signal is expected to propagate through the delay line; and a processor adapted to combine the multiple captures to determine a time of occurrence of the signal.

BRIEF DESCRIPTION OF THE DRAWINGS

FIG. 7 schematically shows, in (a) and (b), an example of increased noise immunity and, in (c) and (d), an example of multiple target identification, by multiple captures of a single signal in a digital delay line according to an aspect of the disclosure. In both examples, the images of multiple captures at different times are time-shifted relative to each other to remove the amount of time-offset between captures. Thus, in the example depicted in (a) and (b), the top row, which represents the latest capture, is advanced (time-shifted forward) by a third, and the bottom row, which represent the earliest capture, is retarded (time-shifted backward) by a third. The captures in the example in (c) and (d) are similarly time shifted. The results are a signal of a higher signal-to-noise ratio, as shown by the strong peak in the middle segment in (b), and identification of multiple targets, as shown by the two strong peaks in (d).

DETAILED DESCRIPTION

This disclosure relates to determining the time-of-flight of signals to a precision higher than the effective clock period, as well as the effective delay element resolution, of the time-measuring system. Although specific examples disclosed in this application pertain to laser pulse detection, other types of signals, such as ultrasonic signals, can be timed using the principles of the invention.

There are several methods of time-of-flight measurement, including amplitude-modulation, pulse-trains, and single-pulse methods. The examples disclosed in this application utilize the single-pulse method. Although categorized as a "single-pulse" method, certain examples disclosed herein utilize multiple pulses. The term "single-pulse" merely means that the time-of-flight can be determined, albeit not necessarily with the best resolution, using a single pulse.

Figure 1:
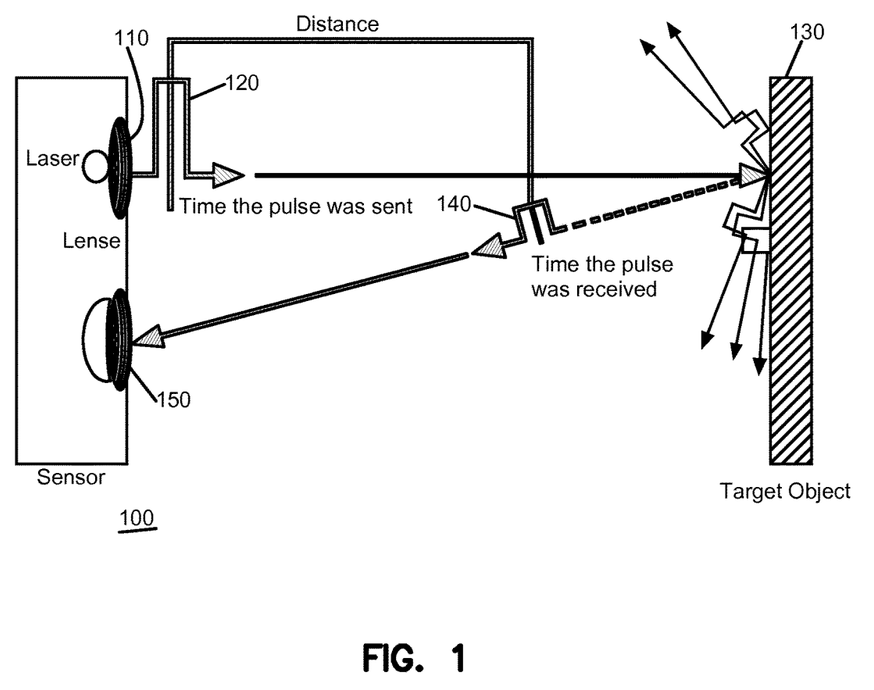
FIG. 1 schematically shows an example system for timing signals according to one aspect of this disclosure.

In single-pulse laser time-of-flight measurement, an example of which is schematically shown in FIG. 1, a short but strong pulse of light (120) is emitted from a light source (110), some of the light energy is reflected from an object (130) in space, and some of this reflected energy (140) is received at a receiving element (150), which can be in the same unit (100) as the emitting element (110).

A time-of-flight engine inside the sensor unit generates an electrical start signal, which is converted into a light pulse (but in other embodiments need not be converted to light), and receives an electrical signal from the received light pulse (but in other embodiments need not be converted from light), and measures the time delay between the start signal and the received signal (sometimes referred to as "stop signal").

There are many existing methods for measuring the time delay between a start and stop electrical signal. There are two limiting factors for these methods: (a) time resolution and (b) signal-to-noise ratio. Many target applications require distance resolution on the order of millimeters. Given the speed of light, the transit time corresponding to one millimeter is 6.7 picoseconds. Thus, to determine a target location to the order of a millimeter, the time resolution must be on the order of 6.7 picoseconds; to determine a target location to within a few millimeters, the time resolution must be on the order of tens of picoseconds or better.

The first class of methods is analog methods, which typically have good time resolution but poor signal-to-noise ratios. An electrical threshold is used to detect the received signal, and thus a very strong receive signal is required. This either limits range, or requires very expensive sensitive components. An electrical pulse is created from the start signal to the received pulse.

The second class of methods is digital methods, which typically have poor time resolution but can work better with lower signal to noise. Digital measurements use discrete counters or elements to time the receive signal, and process these counters and elements digitally to create a time result. As a result, they can handle more noise in the signal, and use digital filtering to discern the signal from the noise. This allows them to use less expensive components to achieve designs of lower cost.

However, these discrete counters or delay elements have very low time resolution. Counters are often limited to system clock frequencies, which are usually in the 100 MHz to 2 GHz range. This gives a time resolution of 10 ns to 500 ps. This is a factor of 100 to 1000 larger than the required time resolution of 6.7 ps. Delay elements are usually in the 20 ps to 1 ns range, again a factory of 10 to 1000 larger than the required time resolution.

However, even though a final time resolution on the order of 6.7 ps is desired, if the signal has temporal jitter (i.e., variability in the temporal location of a point, such as the leading edge of the signal, over measurements for multiple start signal pulses) larger than the measurement resolution, the time resolution can be achieved through averaging.

Figure 2:
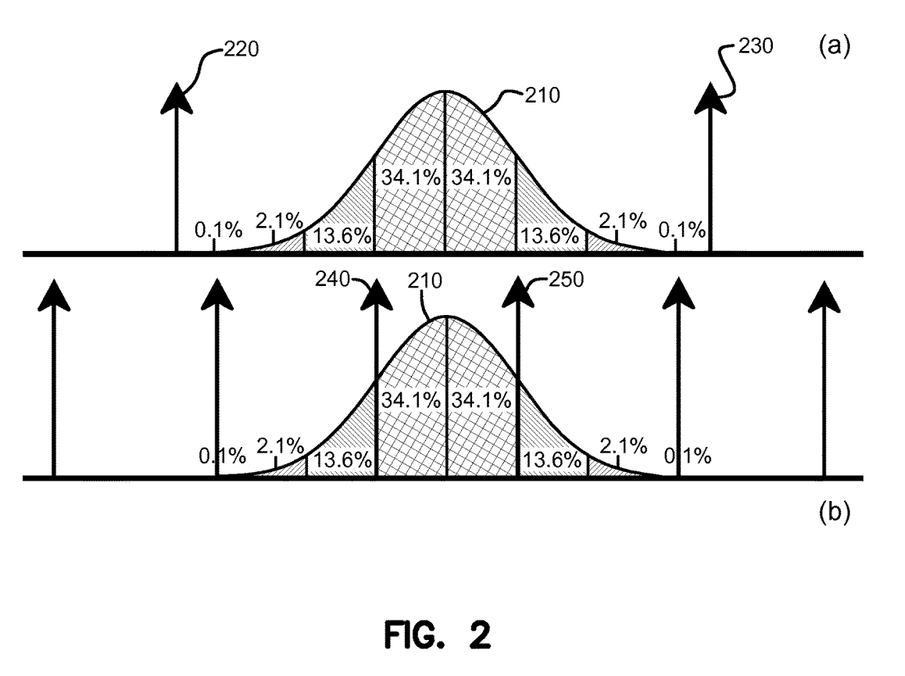
FIG. 2 schematically shows a criterion for selecting a minimum required sampling resolution for an expected range of temporal jitter in a time-of-flight system. For a clock-only based system, the minimum sample resolution would be minimum clock rate; for a delay-element based system, the minimum sample resolution would be the minimum delay time of each delay element.

Referring to FIG. 2, the top diagram (FIG. 2(a)) shows a case where the temporal distribution is smaller than the measurement resolution (i.e., the extent (for example, 66) of distribution (210) of signal location (as measured by, e.g., its edge location) is smaller than the time between to neighboring clock pulses (220) and (230)), and therefore cannot be averaged to a finer time resolution. However, as shown in the bottom diagram (FIG. 2(b)), if the temporal distribution is larger than the measurement resolution (i.e., the extent of distribution (210) of signal location is larger than the time between to neighboring clock pulses (240) and (250)), the received signals can be averaged to achieve a finer time resolution. The temporal jitter of a typical laser time-of-flight electrical system has a standard deviation (a) of 20 to 40 ps.

Digital ASICs have been created with fine time delays smaller than 100 ps, which allows for time averaging, and thus overcome the time resolution limitation. However, developing an ASIC can be expensive. It is desirable to perform this measurement using a flexible, commercially available FPGA.

One known method employing an FPGA is to vary the phase of the start signal, and measure the results off of a coarse clock. Even if the system clock has only 2 to 5 ns resolution, by shifting the phase of the start pulse to, for instance, 16 phases, one can improve the time resolution by a factor of 16, to 125 to 300 ps.

This disclosure provides examples of digital laser time-of-flight measurement in an FPGA using delay elements that are coarser than the desired time resolution. It is noted that those of skill in the art will readily understand that this method could extend to any transmit time measurement and could be implemented by devices other than an FPGA.

Figure 3:
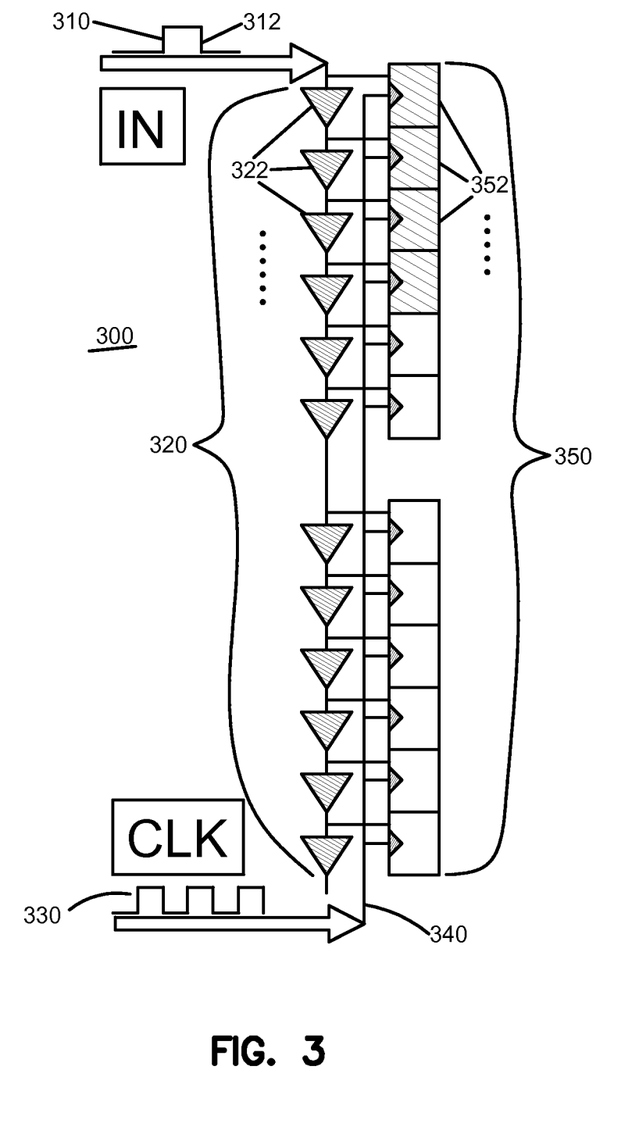
FIG. 3 schematically shows a digital delay line, or a series of digital delay elements, with a corresponding register array for capturing the respective states of the delay elements in an FPGA according to an aspect of the disclosure.

In one example, referring to FIG. 3, in a device (300) for determining the timing of occurrence of a signal (310) with a leading edge (312), an FPGA is used to create a delay line (320), where the delay elements (322) themselves may be non-uniform, i.e., the time delay may vary from element to element, and may be coarse relative to the desired time resolution. Delay elements (322) that are 500 to 1000 ps are used in certain examples, but those skilled in the art will readily understand that the invention is not limited to such examples. Each delay element (322) in this example is switchable between two states, one (1 or 0) indicative of an input signal being high, and the other (0 or 1) indicative of the input signal being low. The signal (310) propagate along the delay line (320), sequentially setting the states of the delay elements (322). The delay line (320) is connected to a memory, such as a register array (350), which includes individual memory elements (352), each connected to a respective delay element (322). A clock line (340) is connected to the memory elements (352) to feed clock pulses (330) to them. Each clock pulse causes the memory elements (352) to record the states of the respective delay elements. A controller (not shown in the drawings) supplies the clock pulses (330) to the clock line (340). A processor (not shown in the drawings) is operatively connected to the memory (350) to receive each captured states of the delay elements (322) along the delay line (320) at with each clock pulse (330). As described in more detail below, according to one aspect of the present disclosure, the states of the delay elements (322) along the delay line (320) are captured multiple times during the time it is expected to take a point (such as leading edge) on the stop pulse (310) to move through the delay line (320) so that the stop signal (310) is captured multiple times along the delay line (320).

A length of the delay must be less than the clocking granularity. In one embodiment of this invention, the system clock is used, and the delay line is longer than one system clock period. In another embodiment of this invention, the delay line is shorter than one system clock period, but multiple phases of the system clock are used together so that the effective clock period is shorter than the delay line. Alternatively, anyone of the multiple phases of the system clock can be used. When the effective clock period is less than the delay line, the received pulse will be captured in the delay line during a clock cycle.

Referring again to FIG. 2(*a*), since each delay element (322) is longer than the signal temporal jitter, it is impossible to measure the leading edge of the signal to a time resolution smaller than the delay element.

Figure 4:
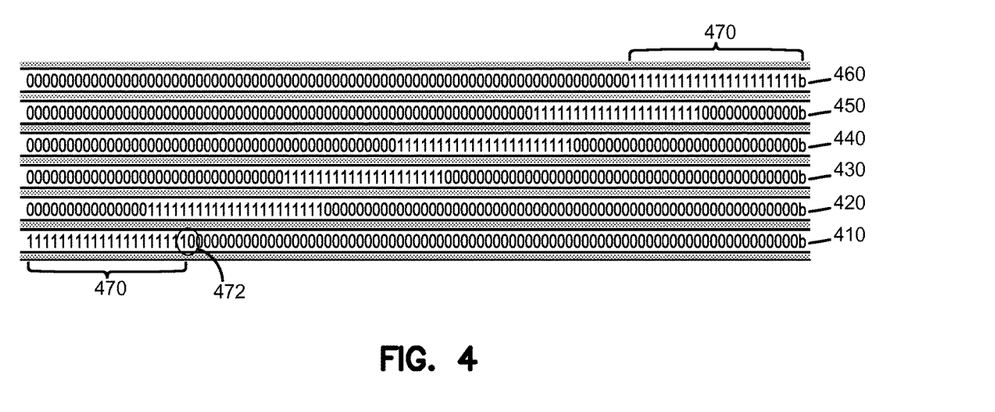
FIG. 4 schematically shows the states of the register array in an FPGA at several different capture times for a single signal according to an aspect of the disclosure.

In order to qualitatively increase the chances of capturing the temporal jitter, the signal (310) is measured multiple times as it traverses the delay line (320). As shown in FIG. 4, in one example, the delay element state distribution along a delay line (320) is captured six times. Thus, for in FIG. 4, received pulse (470), represented by "1"s, with a leading edge (472) (transition from "1" to "0") is shown propagating from left to right (progressively 410, 420, 430, 440, 450 and 460).

Figure 5:
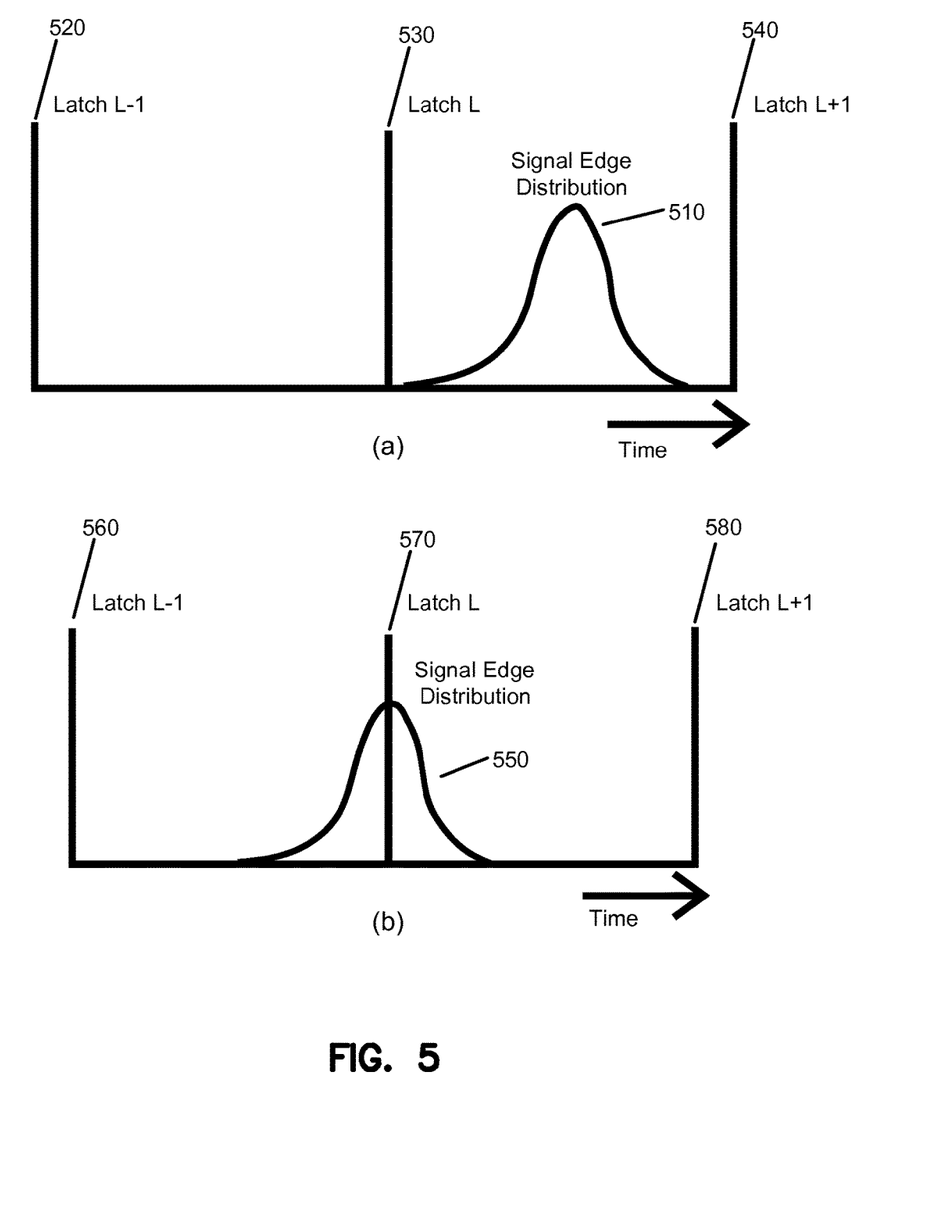
FIG. 5 schematically shows (a) an example in which signal edges are distributed predominately between two adjacent registers, or latches, and (b) an example in which signal edges are distributed predominately around a register, or latch. With multiple captures of a single signal in the delay line according to an aspect of the disclosure, the chances of the scenario depicted in (b) increases, thereby increasing the probability that the signal edge jitter can be measured and averaged to increase the temporal resolution of the time measurement.

Referring to FIG. 5, the edge of the signal has been captured N times. Some of the time, the temporal jitter of the edge lines up in the middle of a delay element, and cannot be averaged. That is, the distribution (510) of the jitter of the signal edge (312) falls between two neighboring memory elements (352), or Latches L and L+1 (L being an integer). In such a scenario, edge jitter will not likely be seen, and the bit pattern for memory elements 520, 530 and 540 in FIG. 5(*a*) will likely remain "110" throughout the measurements for different start signals.

However, statistically, as the number of captures is increased, it is increasingly likely that at least one of the edges will have its temporal jitter distribution (550) line up on a latch boundary (for example Latch L (570) in FIG. 5(*b*)), and then it can be averaged. That is, in the example of FIG. 5(*b*), and the bit pattern for memory elements 560, 570 and 580 in FIG. 5(*b*) will likely be "1b0", where "b" is a bit showing significant switching between "1" and "0" throughout the measurements for different start signals.

Figure 6:
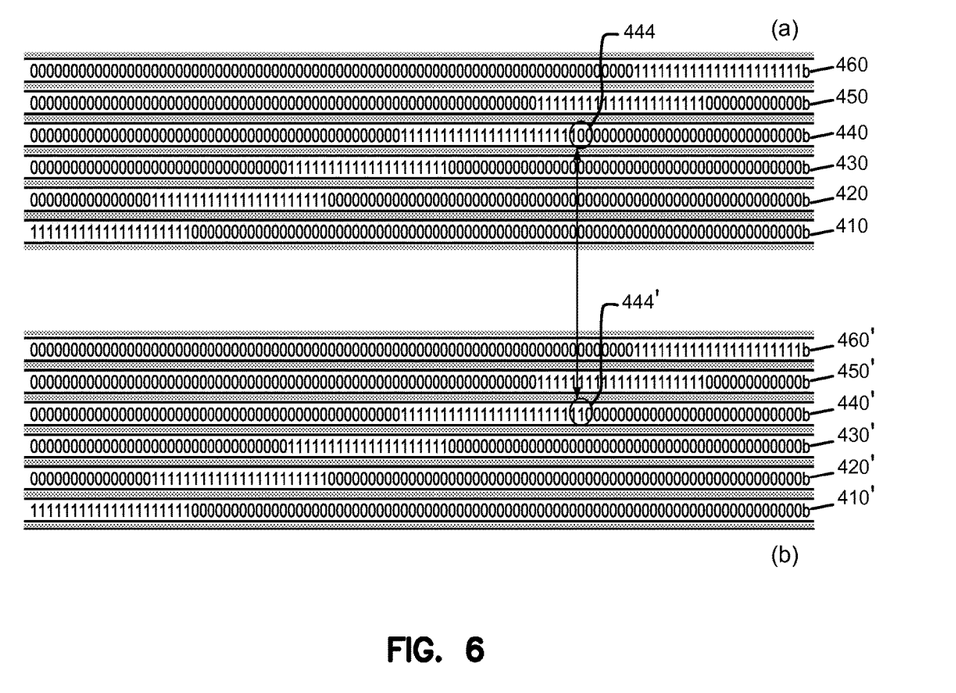
FIG. 6 schematically shows an example in which one (in this example, the third) capture out of six captures the signal edge jitter according to one aspect of the disclosure.

The example in FIG. 6 demonstrates how one of the N (in this example, six) captures shows edge jitter. FIG. 6(*a*) shows the capture bit pattern (410, 420, 430, 440, 450 and 460) for one start signal; FIG. 6(*b*) shows the capture bit pattern (410', 420', 430', 440', 450' and 460') for another start signal. The signal edge (444) (1-to-0 transition) in the fourth capture (440) for the first start signal is slightly later in time than the signal edge (444') in the fourth capture (440') for another start signal. This edge jitter can then be averaged to improve the temporal resolution.

Even if the delay elements are smaller than the edge temporal jitter, such that many or all of edges will see the jitter, this method still has major advantages over prior methods. Primarily, since the signal is captured N times for only a single emitter laser fire, one effectively gets N times as many measurements in the same amount of time. This allows the overall response time of the sensor to be improved by a factor of N, or the overall resolution of the sensor to be improved by a factor of $\sqrt{N}$.

The time delay from the start signal to each of the N edges (counting clock inputs used to trigger the delay line latches, minus the sum of the delay elements leading to the edge) is measured. Then all N of these measurements are averaged along with subsequent measurements up to the response time of the sensor. The resulting average time is converted to distance using the speed of light.

Figure 7:
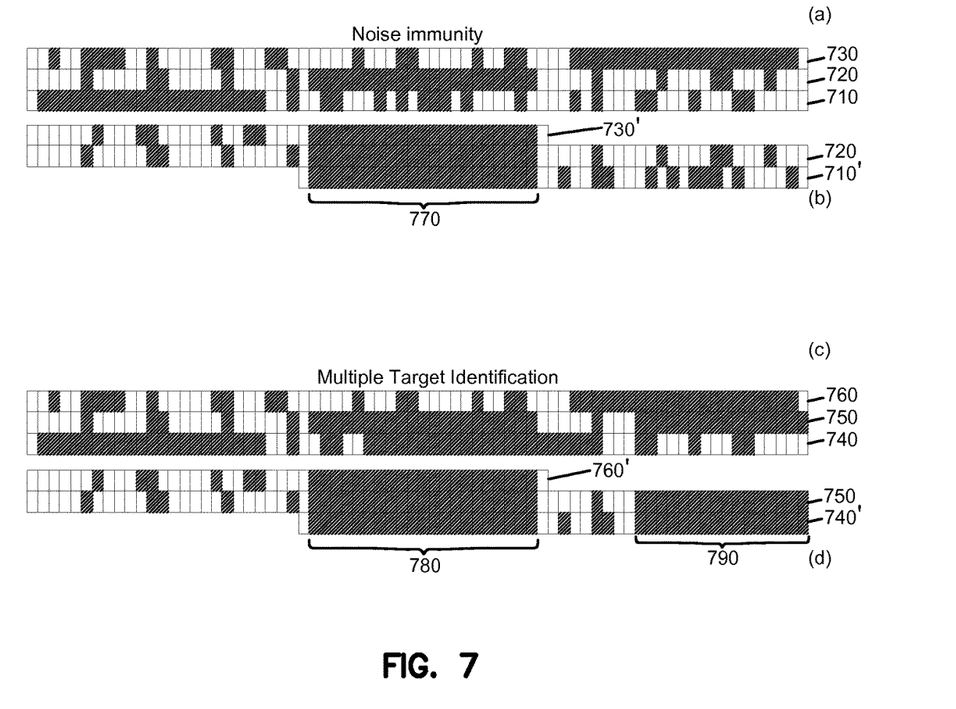

The examples described above have several advantages over conventional methods. Among the advantages are increased noise immunity and enhanced multiple target identification. An example of increased noise immunity, or signal-to-noise ratio, is shown in FIGS. 7(*a*) and (*b*). In both examples, the images of multiple captures at different times are time-shifted relative to each other to remove the amount of time-offset between captures. Thus, in the example depicted in (a) and (b), the top row (730), which represents the latest capture, is advanced (time-shifted forward) by a third, and the bottom row (710), which represent the earliest capture, is retarded (time-shifted backward) by a third. The captures (760 and 740) in the example in (c) and (d) are similarly time shifted. The results are a signal of a higher signal-to-noise ratio, as shown by the strong peak (770) in the middle segment in (b), and a strong indication of multiple targets, as shown by the two strong peaks (780 and 790) in (d).

In another aspect of the present disclosure, the signal edge is identified by first obtaining an average or cumulative value at each delay element and then identify the signal edge based on the distribution of the average or cumulative values over a range of delay elements (or time, which is directly related to the positions of the delay elements).

Figure 8:
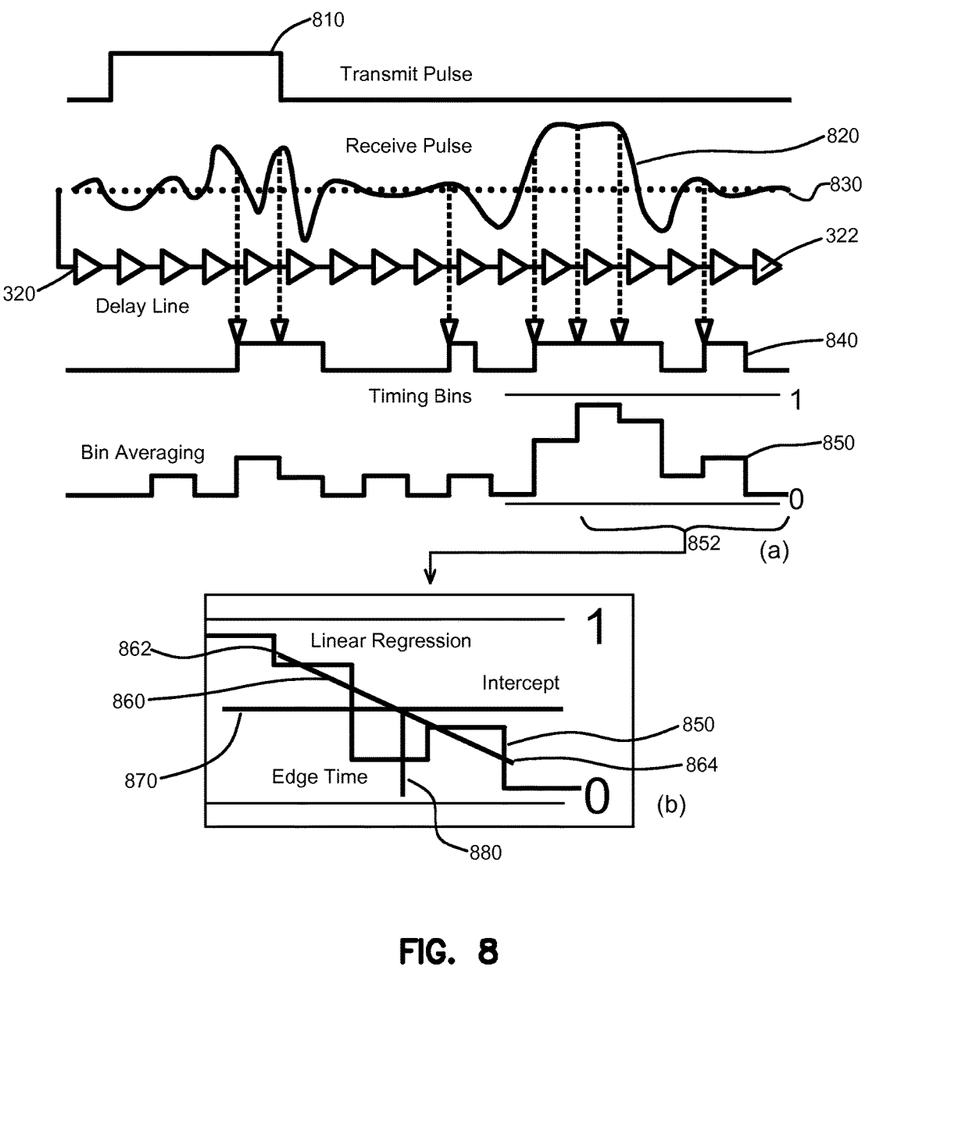
FIG. 8 schematically shows a method of signal edge identification according to an aspect of the disclosure. Instead of defining the high-to-low (1-to-0) transition in each capture as a signal edge, and averaging the temporal positions of edges over multiple captures, the signals at each delay element are first averaged (or simply accumulated) to result in an average (or cumulative) signal shown at the bottom in (a). The tail portion (shown in (b)) of the average (or cumulative) signal is fitted with a monotonic function, such as a straight line by linear regression, between a range such as 10% to 90% of maximum. The edge is then chosen to be the point at a certain fraction (e.g., 50%) of maximum and satisfying the monotonic function.

Referring to FIG. 8(*a*), in an illustrative example, a transmitted pulse, or start signal (810), results in a received pulse, or stop signal (820). The received pulse (820) is propagated along a delay line (320). Each delay element (322) in the delay line (320) is switched to a state indicative of a high signal if the received signal at the element (322) is above a threshold level 830, and to a stated indicative of the low signal otherwise. For a given clock-triggered capture of a delay line (320) in this example, the high signal is presented by 1's, and the low signal is represented by 0's in the captured distribution (840), such that a leading edge is a 1-to-0 transition from left to right.

In a simple approach, the temporal locations of the 1-to-0 transitions can be measured, and the measured temporal locations are then averaged (after appropriate temporal offsets have been taken into account). In an aspect of the present disclosure, a different method is used. In one example, the captured values ("1"s and "0"s) for each delay element (332) are accumulated or averaged over multiple captures, whether for the same start signal or over several start signals. An example of a distribution (850) of averaged captured values is shown at the bottom of FIG. 8(*a*). In this example, the portion (852) of the distribution near the signal edge that exhibits temporal jitter will show an average value of between 0 and 1. Alternatively, cumulative values can be used without averaging. In the latter case, the cumulative values range between 0 and a maximum value.

One way to approximate the position of the edge would be to take the temporal position of delay elements where the average crosses 0.5 (in case of averaging) or 50% of the maximum value (in case of cumulative values). However, this method does not give very good resolution. A method according to another aspect of the disclosure includes interpolating the position of the edge using the average latch values. In one example, illustrated in FIG. 8(b), of this method, the positions of the delay elements (332) that have between a lower (864) and upper threshold (862), e.g., 10% to 90% of the maximum, are converted from delay element space into time-space, and a monotonic function, e.g., a straight line (860), is fitted to the average or cumulative distribution, e.g., by a least-squares regression algorithm. The temporal position (880) of the point on the monotonic curve that is a certain value (such as 50% average or maximum) (870) can then be chosen as the temporal position of the signal edge.

This linear intercept interpolation improves time resolution below that of the delay elements themselves prior to entering the final averaging process.

CONCLUSION

A method and device have been disclosed, wherein the time-of-flight, or the timing of occurrence of a signal can be determined to a precision to a greater temporal resolution than the system clock period or delay element resolution. A signal received by, and propagating in, a series of digital delay elements, or a delay line is captured multiple times during the time it takes a point (such as an edge) in the signal to propagate through the portion of the delay elements. The multiple recorded distributions are combined to determine the timing of occurrence of the signal.

Because many embodiments of the invention can be made without departing from the spirit and scope of the invention, the invention resides in the claims hereinafter appended.

I claim:

1. A method of determining a timing of an occurrence of a signal, the method comprising:
   propagating the signal along a series of delay elements, each of which switchable between at least two states depending on a signal level at the respective delay element;
   at a plurality of times, while the signal is propagating along the series of delay elements, generating a respective plurality of recorded signal, each indicative of the states of the delay elements;
   determining a temporal position of the signal by combining the recorded states of the delay elements at the plurality of time; and
   transmitting a start signal and receiving a signal caused at least in part by the transmitted signal, wherein generating a recorded signal a plurality of times comprises generating the recorded signal at fixed time intervals from the start signal.

2. A method of determining a timing of an occurrence of a signal, the method comprising:
   propagating the signal along a series of delay elements, each of which switchable between at least two states depending on a signal level at the respective delay element;
   at a plurality of times, while the signal is propagating along the series of delay elements, generating a respective plurality of recorded signal, each indicative of the states of the delay elements;
   determining a temporal position of the signal by combining the recorded states of the delay elements at the plurality of time; and
   transmitting a start signal and receiving a signal subsequent to transmission, wherein determining the temporal position of the electrical received signal relative to a temporal position of the start signal, wherein transmitting a start signal comprises transmitting a light pulse into a monitored volume of space, and wherein receiving a signal comprises receiving a light pulse that is at least in part a product of interaction between the transmitted light pulse and an object present in the monitored volume of space and converting the received light pulse into an electrical received signal using a photoelectric device.

3. A method of determining a timing of an occurrence of a signal, the method comprising:
   propagating the signal along a series of delay elements, each of which switchable between at least two states depending on a signal level at the respective delay element;
   at a plurality of times while the signal is propagating along the series of delay elements, generating a respective plurality of recorded signals, each indicative of the states of the delay elements at the respective time; and
   determining a temporal position of the signal by combining the states of the delay elements at the plurality of times.

4. The method of claim 3, wherein determining the temporal position of the signal comprises determining the temporal position to a higher resolution than the amount of time delay in at least one of the delay elements.

5. The method of claim 3, wherein
   the temporal position of the signal has a temporal jitter characterized by a distribution parameter, and
   the propagating the signal along a series of delay elements comprises propagating the signal along a series of delay elements that include at least one delay element having a delay time greater than the distribution parameter.

6. The method of claim 3, wherein the signal is a signal received at a receiver and is at least in part a product of interaction between the a transmitted signal pulse emitted from a transmitter into a monitored region and an object present in the monitored region, the method further comprising determining a signal path length from the transmitter to the object to the receiver based on the temporal position of the received signal relative to a temporal position of the start signal.

7. A method of measure a time difference between a start signal and a stop signal, stop signal comprising a leading period having a first logical level and a trailing period having a second logical level different from the first logical level, the method comprising:
   emitting a plurality of start signals;
   receiving a plurality of stop signals corresponding respectively to the start signals,
   wherein for each of the start- and stop-signal pair:
   propagating the stop signal along a series of delay elements, each of which switchable between at least two states depending on a signal level at the respective delay element; and
   while the stop signal is propagating along the delay line, recording, at a successive plurality of times, the stop signal, including its leading and trailing periods using the delay elements;
   combining the results of the recordings to obtain a total number of times a delay element has detected the first or second logic level;
   determining a temporal position of the stop signal relative to that of the start signal by combining the plurality of recorded states of the delay elements.

8. The method of claim 7, wherein the recording comprises recording the stop signal at fixed time intervals.

9. The method of claim 7, wherein emitting a start signal comprises transmitting a light pulse into a monitored volume of space, and wherein receiving a signal comprises receiving a light pulse that is at least in part a product of interaction between the transmitted light pulse and an object present in the monitored volume of space and converting the received light pulse into an electrical received signal using a photoelectric device.

10. The method of claim 7, wherein determining the temporal position of the signal comprises determining the temporal position to a higher resolution than the amount of time delay in at least one of the delay elements.

11. The method of claim 7, wherein
the temporal position of the stop signal has a temporal jitter characterized by a distribution parameter, and
the propagating the stop signal along a series of delay elements comprises propagating the signal along a series of delay elements that include at least one delay element having a delay time greater than the distribution parameter.

12. The method of claim 7, wherein the stop signal is a signal received at a receiver and is at least in part a product of interaction between the a transmitted signal pulse emitted from a transmitter into a monitored region and an object present in the monitored region, the method further comprising determining a signal path length from the transmitter to the object to the receiver based on the temporal position of the received signal relative to a temporal position of the start signal.

13. The method of claim 7, wherein determining the temporal position of the stop signal comprises generating an average or cumulative logic level for each delay element over the plurality of recorded stop signals, thereby generating a distribution of average or cumulative levels over the delay elements.

14. The method of claim 7, wherein the leading- and trailing periods include noise.

15. The method of claim 7, wherein the determining step comprises:
based on the plurality of recordings for each start- and stop-signal pair, determining an edge-start position as a delay element position later than which the second logic level was recorded at least a first percentage of time, and determining an edge-end position as a delay element position earlier than which the first logic level was recorded no more than the first percentage of time; and
determining a stop signal edge position based on percentages of time the first logic level is recorded by the delay element between the edge-start and edge-end positions.

16. The method of claim 15, wherein the determining of the edge position comprises generating a monotonic function fit to the percentages of time the first logic level is recorded by the delay element between the edge-start and edge-end positions as a function of the delay element position, and determining the position of the signal edge based on the function fit.

17. The method of claim 16, wherein the generating of a monotonic function fit comprises generating a liner fit using a least squares regression.

18. The method of claim 15, where the determining step comprises converting the order of each delay element in the delay line to the temporal positions of the delay element before determining the edge-start and edge-end positions.

19. The method of claim 18, wherein the generating of a monotonic function fit comprises generating a liner fit.

20. The method of claim 19, wherein the generating of a linear fit comprises generating a liner fit using a least squares regression.

21. A device of determining a timing of an occurrence of a signal, comprising:
a plurality of delay elements connected in series and adapted to receive a signal and propagate the signal sequentially through the delay elements, each of the delay elements being switchable between at least two states depending on a signal level at the respective delay element; and
a controller adapted to, at a plurality of times while the signal is propagating along the series of delay elements, generate a respective plurality recorded signals, each indicative of the states of the delay elements at the respective time,
the controller further adapted to determine a temporal position of the received signal by combining the plurality of recorded signals.

22. The device of claim 21, further comprising:
a transmitter adapted to transmit a signal to an object at a time; and
a receiver adapted to receive at least a portion of the transmitted signal reflected by the object and generate the received signal,
the controller being further adapted to record the time the transmitter transmits the signal and determine the temporal position of the received signal relative to the transmission time.

* * * * *

UNITED STATES PATENT AND TRADEMARK OFFICE
CERTIFICATE OF CORRECTION

PATENT NO. : 9,606,228 B1
APPLICATION NO. : 14/184912
DATED : March 28, 2017
INVENTOR(S) : Wise Page 1 of 1

It is certified that error appears in the above-identified patent and that said Letters Patent is hereby corrected as shown below:

In the Claims

Column 8, Line 36, Claim 6: "the a transmitted signal pulse" should read --a transmitted signal pulse--

Column 8, Line 43, Claim 6: "measure" should read --measuring--

Column 8, Line 44, Claim 6: "stop signal" should read --the stop signal-- (Second Occurrence)

Column 9, Line 24, Claim 12: "the a transmitted signal pulse" should read --a transmitted signal pulse--

Signed and Sealed this
Thirteenth Day of March, 2018

Andrei Iancu
*Director of the United States Patent and Trademark Office*